(12) United States Patent
Kerulis

(10) Patent No.: US 10,383,468 B2
(45) Date of Patent: Aug. 20, 2019

(54) ADJUSTABLE CUTLERY IMPLEMENT RESTRAINING SYSTEM

(71) Applicant: Corelle Brands Holdings Inc., Rosemont, IL (US)

(72) Inventor: Patrick Kerulis, Bartlett, IL (US)

(73) Assignee: Corelle Brands Holdings Inc., Rosemont, IL (US)

( * ) Notice: Subject to any disclaimer, the term of this patent is extended or adjusted under 35 U.S.C. 154(b) by 77 days.

(21) Appl. No.: 15/460,159

(22) Filed: Mar. 15, 2017

(65) Prior Publication Data

US 2018/0263393 A1    Sep. 20, 2018

(51) Int. Cl.
*A47G 21/14* (2006.01)
*F16B 1/00* (2006.01)
*F16B 5/00* (2006.01)

(52) U.S. Cl.
CPC .............. *A47G 21/14* (2013.01); *F16B 5/008* (2013.01); *F16B 2001/0035* (2013.01)

(58) Field of Classification Search
CPC ...... A47G 21/14; A47G 21/145; A47B 46/00; A47B 81/00; A47B 81/02; A47F 7/0028
See application file for complete search history.

(56) References Cited

U.S. PATENT DOCUMENTS

| | | | |
|---|---|---|---|
| 1,742,102 A | 12/1929 | Seagles | |
| 2,505,510 A * | 4/1950 | Vermillion | A47G 21/14 206/372 |
| 2,609,921 A * | 9/1952 | Naken | A47G 21/14 206/207 |
| 2,736,426 A * | 2/1956 | Hamilton | B25H 3/003 206/379 |
| 2,826,879 A | 3/1958 | Evans | |
| 3,846,005 A * | 11/1974 | Harper | A47B 77/04 312/248 |
| 4,374,565 A * | 2/1983 | Neumann | B43M 99/007 211/168 |
| 4,492,028 A * | 1/1985 | Bourgein | A47G 21/14 211/89.01 |
| 4,537,315 A * | 8/1985 | Griffin | A47G 21/14 206/553 |

(Continued)

FOREIGN PATENT DOCUMENTS

| EP | 0381815 A1 * | 8/1990 | ............. A47G 21/14 |
|---|---|---|---|
| WO | WO-2007048699 A1 * | 5/2007 | ............. A47B 77/14 |

*Primary Examiner* — Stanton L Krycinski
(74) *Attorney, Agent, or Firm* — Morgan, Lewis & Bockius LLP

(57) ABSTRACT

A cutlery implement restraining system is provided. The cutlery implement restraining system includes a housing having a base, an upper wall, a front wall, a back wall and a sidewall, the sidewall extending substantially between the front wall and the back wall, and the sidewall extending substantially between the base and the upper wall, a cavity formed in the housing, the cavity at least partially bounded by the base, the front wall and the back wall, an implement carrier disposed within the cavity, the implement carrier being selectively positionable between a first position and a second position relative to the housing, and a securement system for releasably securing the implement carrier in the first position relative to the housing, the securement system being disposed on at least one of either the implement carrier and the housing.

17 Claims, 3 Drawing Sheets

(56) References Cited

U.S. PATENT DOCUMENTS

| | | | |
|---|---|---|---|
| 4,601,400 A * | 7/1986 | Buchanan | B25H 3/003 211/70.7 |
| 4,966,339 A | 10/1990 | Lu | |
| 5,494,176 A | 2/1996 | Zallo | |
| 6,047,830 A * | 4/2000 | Chang | A47G 21/14 206/372 |
| 6,079,108 A | 6/2000 | Lin | |
| 6,371,312 B1 | 4/2002 | Tsuchida | |
| 6,581,774 B1 * | 6/2003 | Galafassi | A47G 21/14 206/379 |
| 6,659,406 B2 | 12/2003 | Tsuchida | |
| 6,854,186 B2 | 2/2005 | Basden | |
| 6,920,987 B2 * | 7/2005 | Siegel | A47G 21/14 211/1.3 |
| D532,658 S | 11/2006 | Shen et al. | |
| 7,210,588 B1 * | 5/2007 | Ayon | A47G 21/14 211/70.7 |
| 7,267,238 B2 | 9/2007 | Yang et al. | |
| 7,422,180 B2 | 9/2008 | Tang | |
| 7,637,803 B2 | 12/2009 | Welch | |
| 9,770,126 B2 | 9/2017 | Ludeman et al. | |
| 2004/0031769 A1 | 2/2004 | Schultz | |
| 2004/0211737 A1 | 10/2004 | Siegel et al. | |
| 2005/0082307 A1 | 4/2005 | Tucker | |
| 2006/0022094 A1 * | 2/2006 | Schmidt | A47G 21/14 248/37.3 |
| 2007/0144987 A1 | 6/2007 | Linzing et al. | |
| 2008/0276465 A1 | 11/2008 | Lafleur | |
| 2009/0106982 A1 | 4/2009 | Kushner | |
| 2012/0324740 A1 | 12/2012 | Brough | |
| 2015/0107117 A1 | 4/2015 | Bell | |
| 2015/0257563 A1 | 9/2015 | Ludeman et al. | |

* cited by examiner

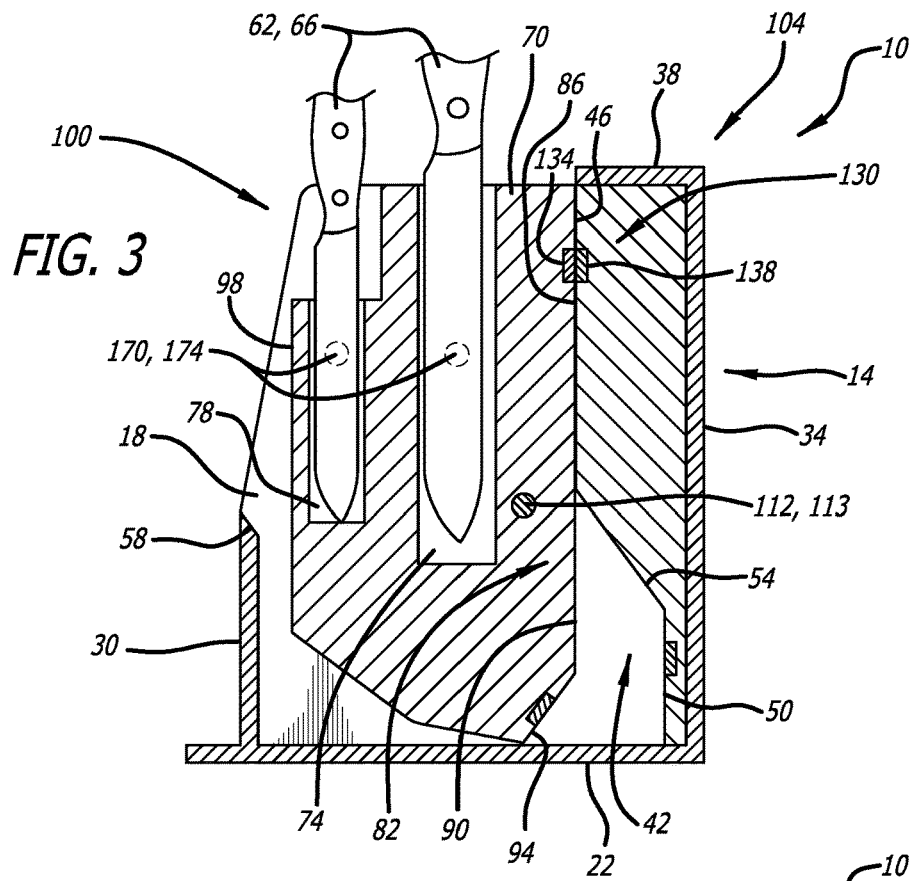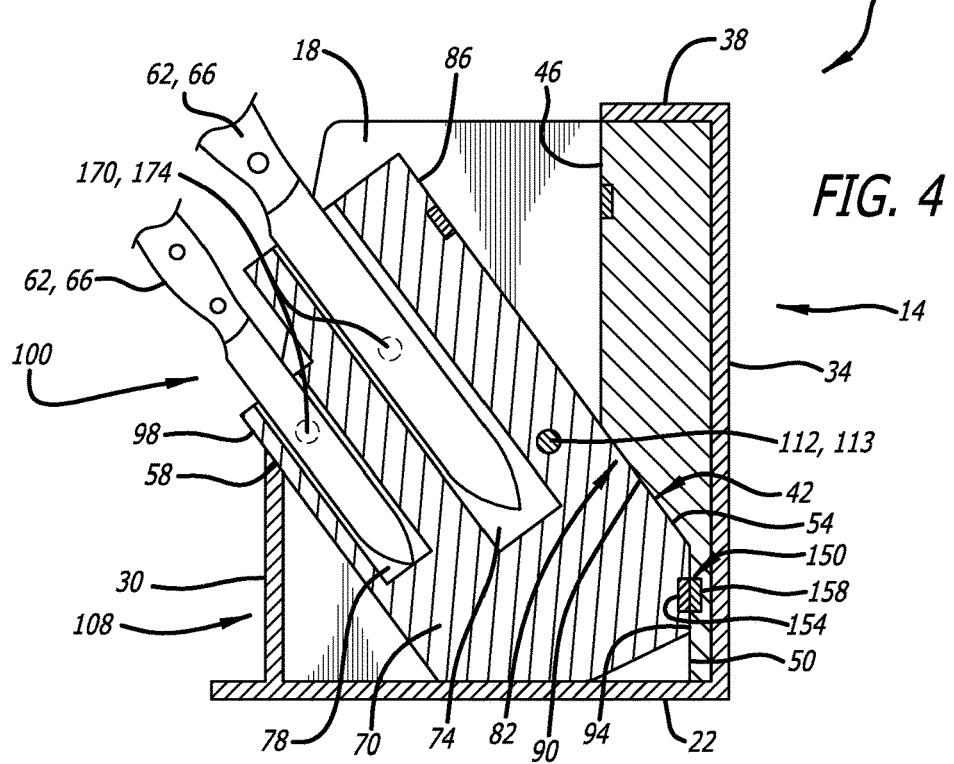

ADJUSTABLE CUTLERY IMPLEMENT RESTRAINING SYSTEM

TECHNICAL FIELD

The present disclosure relates to a cutlery implement restraining system and more particularly, to a knife block with adjustable cutlery implement carriers.

BACKGROUND

Knife blocks are generally known in the art. However, known knife blocks do not conveniently and customizably support a range of knife types, shapes, proportions and sizes. Further, known knife blocks do not customizably support a range of knives in selectable positions within the knife block. A non-adjustable knife block limits user options in knife storage and securement. The need for flexible and customizable storage and securement is particularly significant for a user with a wide range of knives or tools for use in various tasks and environments. The accessories or integrated features available in known knife blocks do not adequately address the above-mentioned issues.

The present disclosure is provided to address the problems discussed above and other problems, and to provide advantages and aspects not presently provided by known knife blocks. A full discussion of the features and advantages of certain preferred embodiments of the present disclosure is deferred to the following detailed description, which proceeds with reference to the accompanying drawings.

SUMMARY

In some embodiments of the present disclosure, a cutlery implement restraining system is provided. The cutlery implement restraining system includes a housing having a base, an upper wall, a front wall, a back wall and a sidewall, the sidewall extending substantially between the front wall and the back wall. The sidewall extends substantially between the base and the upper wall. A cavity is formed in the housing. The cavity is at least partially bounded by the base, the front wall and the back wall. An implement carrier is disposed within the cavity. The implement carrier is selectively positionable between a first position and a second position relative to the housing. The cutlery implement restraining system also includes a securement system for releasably securing the implement carrier in the first position relative to the housing. The securement system is disposed on either (or both of) the implement carrier or the housing.

In other embodiments of the present disclosure, a cutlery implement carrier is provided. The cutlery implement carrier includes an interior cavity and an exterior, and further includes a first slot open to an exterior of the cutlery implement carrier. The first slot is adapted to receive a cutlery implement. The cutlery implement carrier has a back surface that includes an upper portion and a lower portion. The cutlery implement carrier also includes a lower surface. The cutlery implement carrier is at least partially disposed within a housing and is selectively positionable between a first position and a second position relative to the housing. The cutlery implement carrier is releasably secured in the first position by a securement system disposed on either (or both of) the cutlery implement carrier or the housing.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 3 is a side view of an implement carrier disposed within an adjustable cutlery implement restraining system according to exemplary embodiments of the present disclosure.

FIG. 4 is a side view of the implement carrier and the adjustable cutlery implement restraining system of FIG. 3, showing the implement carrier in a configuration different from that shown in FIG. 3.

DETAILED DESCRIPTION

Figure 1:
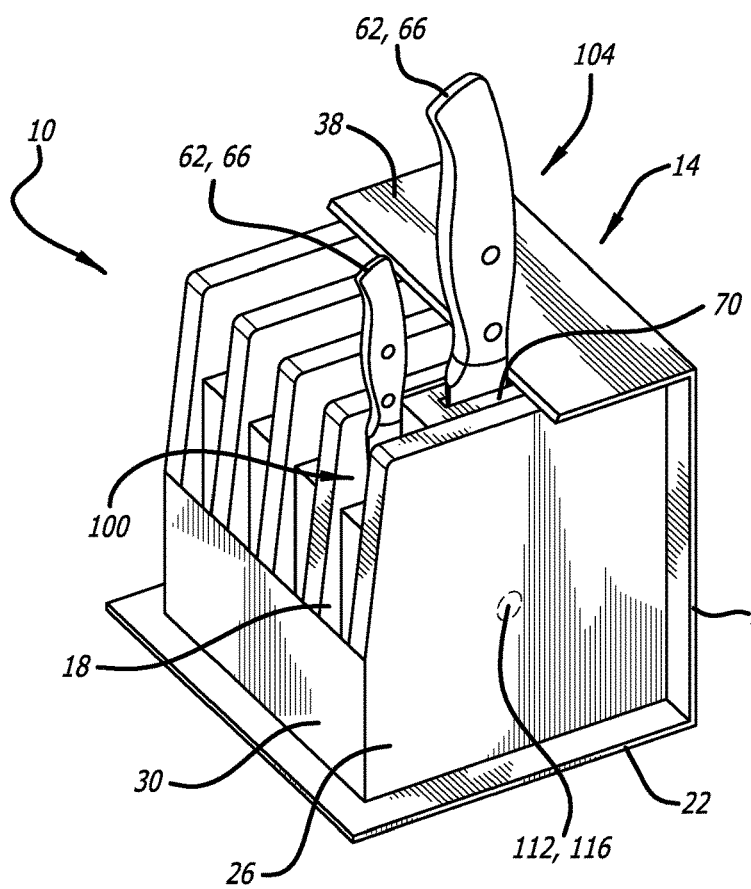
FIG. 1 is a top perspective view of an adjustable cutlery implement restraining system according to exemplary embodiments of the present disclosure.
Figure 2:
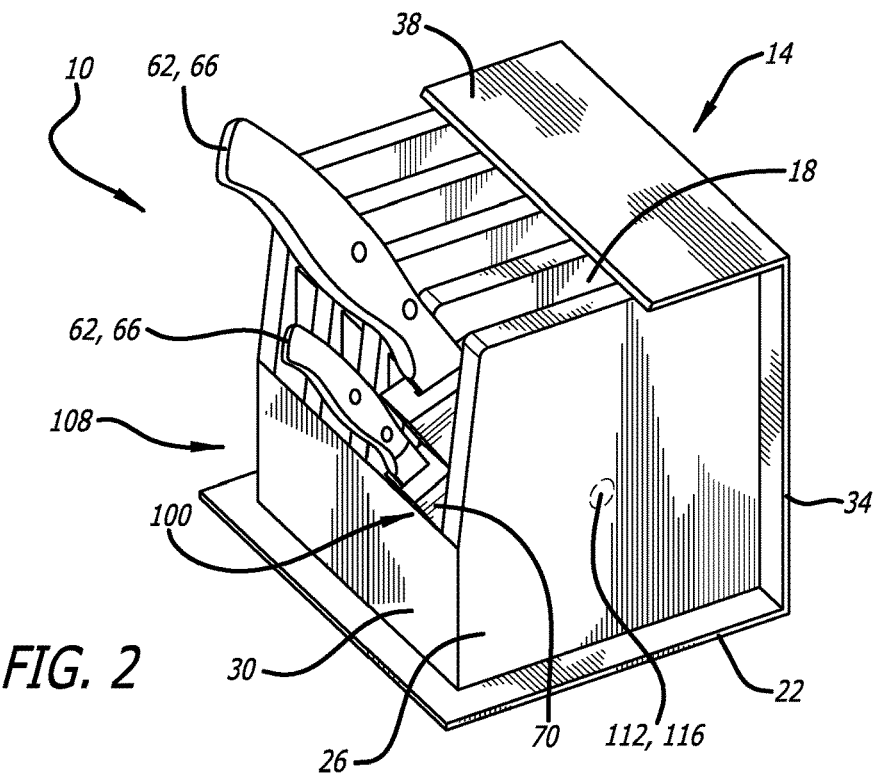
FIG. 2 is a top perspective view of the adjustable cutlery implement restraining system of FIG. 1, showing the implement restraining system in a configuration different from that shown in FIG. 1.

While this disclosure is susceptible of embodiments in many different forms, there is shown in the drawings and will herein be described in detail embodiments of the disclosure with the understanding that the present disclosure is to be considered as an exemplification of the principles of the disclosure and is not intended to limit the broad aspects of the disclosure to the embodiments illustrated.

Disclosed herein are various embodiments of a knife block 10. The knife block 10 includes a housing 14 defining one or more cavities 18. The housing 14 includes, in some embodiments, a base 22, a sidewall 26, a front wall 30, a back wall 34 and an upper surface 38. One or more of these features 14, 22, 26, 30, 34, 38 forms the cavity 18, as best illustrated in FIGS. 1-4. The cavities are configured to receive cutlery implements of varying shapes and sizes. Such implements can, for example, include knives, scissors, sharpeners and other implements. The base 22 may be disposed on a surface orientated substantially normal to a direction of a gravitational force and such a knife block 10 orientation is termed an 'upright' orientation.

Turning to FIGS. 3 and 4, the housing 14 and/or the back wall 34, includes a stop surface 42. In some embodiments, the stop surface 42 extends substantially between the base 22 and the upper surface 38 and includes a number of stop surfaces for interacting with various elements of the knife block 10. In particular, the stop surface 42 includes an upper stop surface 46 and a lower stop surface 50. The upper stop surface 46 is disposed closer to the upper surface 38 than is the lower stop surface 50. Similarly, the lower stop surface 50 is disposed closer to the base 22 than is the upper stop surface 46. Additionally, the lower stop surface 50 is disposed closer to the back wall 34 than is the upper stop surface 46.

An angled stop surface 54 is disposed between the upper stop surface 46 and the lower stop surface 50 along the stop surface 42. While in some embodiments the upper stop surface 46 and the lower stop surface 50 are substantially parallel, the angled stop surface 54 is arranged at an angle relative to the upper and lower stop surfaces 46, 50. The angular relationship results from the lower stop surface 50 being disposed closer to the back wall 34 than is the upper stop surface 46.

A front wall contact surface 58, shown in FIGS. 3 and 4, is formed on an upper portion of the front wall 30. The front wall contact surface 58 may be angled relative to the front wall 30 by substantially the same angle as the upper and lower stop surfaces 46, 50 are angled relative to the angled stop surface 54. An implement 62, which in some embodiments is a knife 66 or another cutlery implement or cutlery-associated tool, is also shown in FIGS. 3 and 4.

Figure 5:
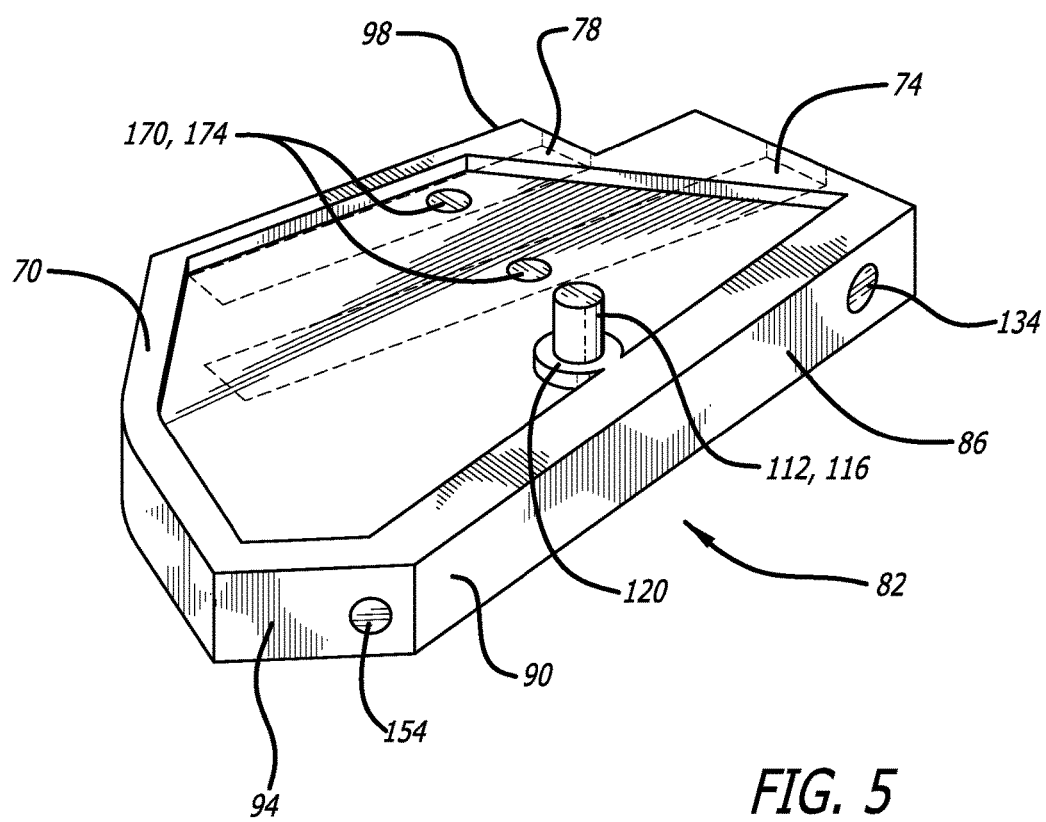
FIG. 5 is a perspective view of an implement carrier according to exemplary embodiments of the present disclosure.

As shown in FIG. 5, the implement carrier 70 includes a first slot 74 open to an exterior of the implement carrier 70. The first slot 74, also shown in FIGS. 3 and 4, receives and houses the implement 62 that is selectively insertable into the first slot 74. The implement carrier 70, in some embodiments, includes a second slot 78 also open to an exterior of the implement carrier 70 for receiving and housing a selectively insertable implement 62. It is to be understood that implement carriers 70 having any number of slots are within the scope of this disclosure. Additionally, the first slot 74, second slot 78 and any additional slots within the implement carrier 70 may each be adapted for receiving a different implement 62 or implements of varying sizes, shapes and types.

The implement carrier 70 includes a carrier back surface 82 forming a carrier back upper surface 86 and a carrier back lower surface 90. A carrier stop surface 94 and a carrier front surface 98 are formed on the implement carrier 70. Relationships and interactions between these elements and surfaces will be described below in detail.

An implement restraining system 100 is disclosed. The implement restraining system 100 includes a cavity 18, within which an implement carrier 70 is disposed. The implement carrier 70 is, in some embodiments of the implement restraining system 100, selectively positionable between multiple orientations or arrangements within the knife block 10. As illustrated in FIG. 3, the implement carrier 70 can be selectively arranged in a first position 104 relative to the cavity 18. In some embodiments, the first position 104 involves the upper stop surface 46 being at least partially in contact with the carrier back upper surface 86. Also in the first position 104, the first slot 74 and the second slot 78 are, in some embodiments, substantially parallel with the front wall 30 and/or the back wall 34 and substantially vertical when the knife block 10 is arranged in the 'upright orientation.'

As illustrated in FIG. 4, the implement carrier 70 can be selectively arranged in a second position 108 relative to the cavity 18. The second position 108 involves, in some embodiments, the lower stop surface 50 being at least partially in contact with the carrier stop surface 94. In some embodiments, the second position 108 also involves the angled stop surface 54 being at least partially in contact with the carrier back lower surface 90 and/or involves the carrier front surface 98 being at least partially in contact with the front wall contact surface 58. Also in the second position 108, the first slot 74 and the second slot 78 are angularly askew relative to the front wall 30 and/or the back wall 34 when viewed from the side viewpoint of FIG. 4.

In exemplary embodiments of the present disclosure, the implement carrier 70 rotates between the first position 104 and the second position 108. A pivot system 112 enables the implement carrier 70 to pivot relative to the knife block 10 and cavity 18 about a pivot point 113. The implement carrier 70 may also incorporate sliding relative to the cavity 18 in addition to, or in place of, relative rotation to transition between the first position 104 and the second position 108. The pivot system 112 includes, in some embodiments, a pin 116 that facilitates relative rotation between the cavity 18 and the implement carrier 70. In some embodiments, the pin 116 is fixed to at least one sidewall 26 of the housing 14 and operatively associates with a carrier grommet 120 to enable relative rotation of the implement carrier 70 and the cavity 18. In some embodiments, the pin 116 is fixed to the implement carrier 70 and operatively associates with elements of the sidewall 26 of the housing 14 to enable relative rotation of the implement carrier 70 and the cavity 18. Additionally, in some embodiments of the present disclosure the pin 116 is distinct from both the implement carrier 70 and the sidewall 26, and are operatively associated with elements of the sidewall 26 and the carrier grommet 120 to enable relative rotation of the implement carrier 70 and the cavity 18.

A first securement system 130, disposed on one or more of the housing 14 and the implement carrier 70, releasably secures the implement carrier 70 in the first position 104 relative to the housing 14 or cavity 18. In some embodiments, the first securement system includes a first permanent magnetic surface 134 is disposed on the carrier back upper surface 86 and a second permanent magnetic surface 138 is disposed on the upper stop surface 46. The first permanent magnetic surface 134 is mutually attractive with the second permanent magnetic surface 138, and magnetic interactions therebetween releasably secure the implement carrier 70 in the first position 104 relative to the housing 14 or cavity 18. In some embodiments, such a releasable securement requires an input or manipulation by a user to cause the implement carrier 70 to move from the first position 104 to another position.

A second securement system 150, disposed on one or more of the housing 14 and the implement carrier 70, releasably secures the implement carrier 70 in the second position 108 relative to the housing 14 or cavity 18. The second securement system 150 is distinct from the first securement system 130. In some embodiments, the second securement system includes a third permanent magnetic surface 154 is disposed on the carrier stop surface 94 and a fourth permanent magnetic surface 158 is disposed on the lower stop surface 50. The third permanent magnetic surface 154 is mutually attractive with the fourth permanent magnetic surface 158, and magnetic interactions therebetween releasably secure the implement carrier 70 in the second position 108 relative to the housing 14 or cavity. In some embodiments, such a releasable securement requires an input or manipulation by a user to cause the implement carrier 70 to move from the second position 108 to another position.

In some embodiments, the knife block 10 includes only the first securement system 130. In such an embodiment, the first securement system 130 releasably secures the implement carrier 70 in the first position 104, while a gravitational force releasably secures the implement carrier 70 in the second position 108. Accordingly, an input or manipulation by a user is required to cause the implement carrier 70 to move from the first position 104 and overcome the releasable attachment of the first securement system 130. Further, the implement carrier 70 would be gravitationally-biased towards the second position 108 when disposed in the second position 108 or in an intermediate position between the first position 104 and the second position 108.

Either or both of the first and second securement system 130, 150 can releasably secure the implement carrier 70 in the first position 104 or the second position 108 using frictional forces resulting from an interference fit between a portion of the implement carrier 70 and at least a portion of the housing 14.

In some embodiments, an electric motor (not shown) is included within the knife block 10 and serves to rotate the implement carrier 70 between the first and second positions 104, 108 upon receiving a command or signal. Either or both of the first or second securement systems 130, 150 may include any releasable securement technology including, but not limited to, electromagnets, hook-and-loop panels, mechanical hooks, mechanical fasteners, adhesives, biasing elements, frictional securement elements and geometric implement carrier 70 and cavity 18 arrangements that allow the implement carrier 70 to be releasably secured in the first or second positions 104, 108.

While the first position 104 and the second position 108 are shown and described, additional positions, between the first position 104 and the second position 108 or otherwise, are included within the scope of this disclosure. Further, it is to be understood that knife blocks 10 including any number of cavities 18 and corresponding implement carriers 70 are within the scope of this disclosure.

In some embodiments, the implement carrier 70 includes a slot securement system 170 for releasably securing an implement 62 within the first or second slot 74, 78. The slot securement system 170 may include an implement magnet 174 disposed in the implement carrier 70 near, or along, the first or second slot 74, 78. Other releasable securement technologies including, but not limited to, electromagnets, hook-and-loop panels, mechanical hooks, mechanical fasteners, adhesives, biasing elements and frictional securement elements may be used by the slot securement system 170 for releasably securing the implement 62 to the first or second slot 74, 78.

The disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The invention claimed is:

1. A cutlery implement restraining system, comprising:
a housing having a base, an upper wall, a front wall, a back wall and a sidewall, the sidewall extending substantially between the front wall and the back wall, and the sidewall extending substantially between the base and the upper wall;
a cavity formed in the housing, the cavity at least partially bounded by the base, the front wall and the back wall;
an implement carrier disposed within the cavity, the implement carrier being selectively positionable between a first position and a second position relative to the housing;
a first securement system for releasably securing the implement carrier in the first position relative to the housing, the first securement system comprising a first permanent magnetic surface disposed on the housing and a second permanent magnetic surface mutually attractive with the first permanent magnetic surface, the second permanent magnet surface being disposed on the implement carrier; and
a second securement system for releasably securing the implement carrier in the second position, the second securement system being distinct from the first securement system and the second securement system comprising a third permanent magnetic surface disposed on the housing and a fourth permanent magnetic surface mutually attractive with the third permanent magnetic surface and disposed on the implement carrier.

2. The cutlery implement restraining system of claim 1, wherein the implement carrier is selectively pivotable between the first and second positions.

3. The cutlery implement restraining system of claim 1, wherein the securement system releasably secures the implement carrier in the first position by frictional forces resulting from an interference fit between the implement carrier and at least a portion of the housing.

4. The cutlery implement restraining system of claim 1, wherein the implement carrier includes a slot for receiving a cutlery implement, a portion of the slot being open to an exterior of the implement carrier.

5. The cutlery implement restraining system of claim 4, wherein the implement carrier includes a plurality of slots, each slot adapted for receiving a cutlery implement.

6. The cutlery implement restraining system of claim 4, wherein the slot includes a cutlery implement securement system for releasably securing the cutlery implement within the slot.

7. The cutlery implement restraining system of claim 5, wherein each of the plurality of slots is adapted for receiving a different cutlery implement.

8. A cutlery implement carrier having an interior cavity and an exterior, the cutlery implement carrier comprising:

a first slot open to the exterior of the cutlery implement carrier, the first slot adapted to receive a cutlery implement;

a cutlery implement carrier back surface including an upper portion and a lower portion;

a cutlery implement carrier lower surface, the cutlery implement carrier being at least partially disposed within a housing having a base, an upper wall, a front wall, a back wall and a sidewall, the sidewall extending substantially between the front wall and the back wall, and the sidewall extending substantially between the base and the upper wall, the cutlery implement carrier being selectively positionable between a first position and a second position relative to the housing, the cutlery implement carrier being releasably secured in the first position by a first securement system, the first securement system comprising a first permanent magnetic surface disposed on the housing and a second permanent magnetic surface mutually attractive with the first permanent magnetic surface, the second permanent magnet surface being disposed on the implement carrier; and a second securement system for releasably securing the implement carrier in the second position, the second securement system being distinct from the first securement system and the second securement system comprising a third permanent magnetic surface disposed on the housing and a fourth permanent magnetic surface mutually attractive with the third permanent magnetic surface and disposed on the implement carrier.

9. The cutlery implement carrier of claim 8, wherein the cutlery implement carrier is selectively pivotable between the first and second positions.

10. The cutlery implement carrier of claim 8, wherein in the first position, the upper portion of the cutlery implement carrier back surface contacts an upper stop surface of the housing.

11. The cutlery implement carrier of claim 8, wherein in the second position, the cutlery implement carrier lower surface contacts a lower stop surface of the housing.

12. The cutlery implement carrier of claim 8, wherein in the second position, the lower portion of the cutlery implement carrier back surface contacts an angled stop surface of the housing, the angled stop surface being disposed substantially between an upper stop surface of the housing and a lower stop surface of the housing, and wherein the third permanent magnetic surface is disposed on the angled stop surface of the housing.

13. The cutlery implement carrier of claim 8, wherein the cutlery implement carrier includes a plurality of slots, each slot adapted for receiving a cutlery implement.

14. A cutlery implement restraining system, comprising:
a housing having a base, an upper wall, a front wall, a back wall and a sidewall, the sidewall extending substantially between the front wall and the back wall, and the sidewall extending substantially between the base and the upper wall;

a cavity formed in the housing, the cavity at least partially bounded by the base, the front wall and the back wall;

a plurality of implement carriers, each of the plurality of implement carriers being disposed within the cavity and adjacent another of the implement carriers, each of the plurality of implement carriers being selectively positionable between a first position and a second position relative to, and independent from, at least one other of the plurality of implement carriers; and a securement system for releasably securing each of the implement carrier in the first position relative to the housing, the securement system comprising a first permanent magnetic surface disposed on the housing and a second permanent magnetic surface mutually attractive with the first permanent magnetic surface, the second permanent magnet surface being disposed on the implement carrier.

15. The cutlery implement restraining system of claim 14, wherein the first permanent magnetic surface is comprised of a plurality of individually spaced magnetic surfaces.

16. The cutlery implement restraining system of claim 14, wherein the second permanent magnetic surface is comprised of a plurality of individually spaced magnetic surfaces.

17. The cutlery implement restraining system of claim 1, wherein in the second position, a lower portion of a back surface of the implement carrier contacts an angled stop surface of the housing, the angled stop surface being disposed substantially between an upper stop surface of the housing and a lower stop surface of the housing, and wherein the third permanent magnetic surface is disposed on the angled stop surface of the housing.

* * * * *